United States Patent
Muller et al.

(10) Patent No.: US 6,981,495 B2
(45) Date of Patent: Jan. 3, 2006

(54) WIRE SAWING PROCESS AND DEVICE

(75) Inventors: Andreas Muller, Weggis (CH);
Alexander Bortnikov, Moscou (RU)

(73) Assignee: HCT Shaping Systems SA, Cheseaux (CH)

( * ) Notice: Subject to any disclaimer, the term of this patent is extended or adjusted under 35 U.S.C. 154(b) by 16 days.

(21) Appl. No.: 10/781,762

(22) Filed: Feb. 20, 2004

(65) Prior Publication Data

US 2004/0194773 A1    Oct. 7, 2004

(30) Foreign Application Priority Data

Apr. 1, 2003    (CH) .................................... 583/03

(51) Int. Cl.
*B23D 57/00*    (2006.01)
(52) U.S. Cl. ..................... 125/21; 125/16.02; 125/19
(58) Field of Classification Search ............ 125/16.02, 125/16.03, 19, 21
See application file for complete search history.

(56) References Cited

U.S. PATENT DOCUMENTS

| 4,646,710 | A |   | 3/1987  | Schmid et al. |
|-----------|---|---|---------|---------------|
| 5,080,085 | A | * | 1/1992  | Lovato ......................... 125/21 |
| 5,735,258 | A |   | 4/1998  | Okuno et al. |
| 5,893,308 | A | * | 4/1999  | Katamachi et al. ............ 83/13 |
| 5,937,844 | A | * | 8/1999  | Kiuchi et al. ............. 125/16.02 |
| 6,145,422 | A | * | 11/2000 | Katamachi et al. ............ 83/74 |
| 6,283,111 | B1| * | 9/2001  | Onizaki et al. .......... 125/16.01 |
| 6,371,101 | B1| * | 4/2002  | Hauser ..................... 125/16.01 |

FOREIGN PATENT DOCUMENTS

| DE | 196 38 990   | 3/1997 |
|----|--------------|--------|
| WO | WO 91/12915  | 5/1991 |
| WO | WO 02/26431  | 4/2002 |

* cited by examiner

*Primary Examiner*—Lee D. Wilson
*Assistant Examiner*—Anthony Ojini
(74) *Attorney, Agent, or Firm*—Young & Thompson

(57) ABSTRACT

In the sawing process and device according to the invention, the pieces to be sawed are mounted on at least one support table and caused to bear against a layer of wires. Inclination structure in the form of wedges or pieces for angular adjustment by pivoting and blocking, are provided to mount the pieces obliquely with angles of inclination between one of their prismatic surfaces and a horizontal working plane. There is thus obtained a precise beginning of sawing with sawed slices of equal thickness and a careful end of cutting without chipping.

14 Claims, 4 Drawing Sheets

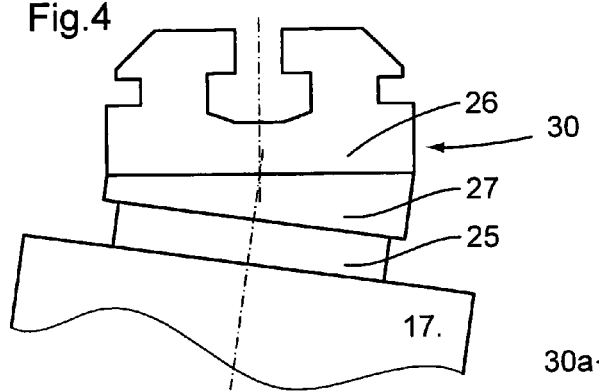
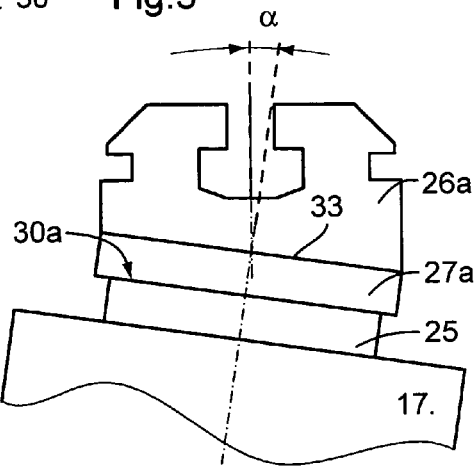
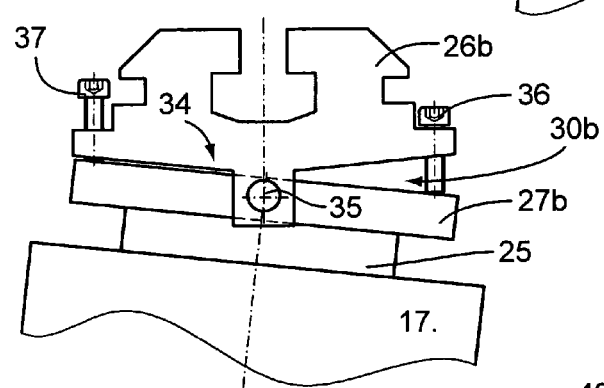
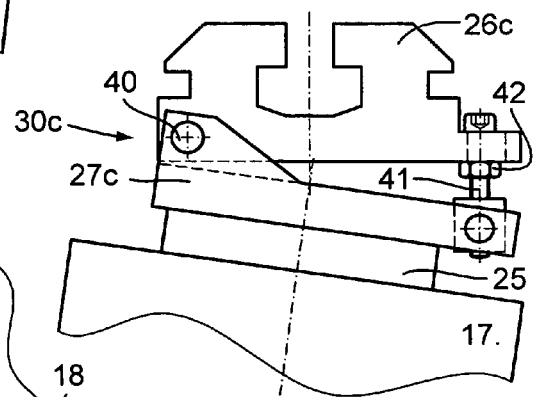
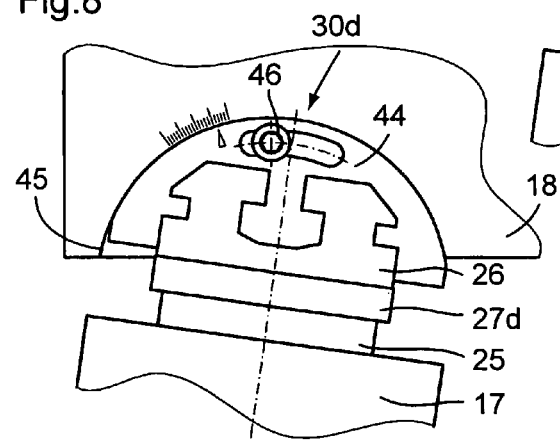

WIRE SAWING PROCESS AND DEVICE

FIELD OF THE INVENTION

The present invention relates to a wire sawing process comprising sawing at least one prismatic piece to be sawed with a substantially square or rectangular base, by means of at least one layer of wires stretched between at least two wire guide cylinders whose axes are parallel to a working plane and held in position by grooves provided on the surface of the wire guide cylinders which define the interval between the wires of the layer of wires, hence the thickness of the sawed slices, the wires of the layer being adapted to move with alternating or continuous motion whilst bearing against the piece or pieces to be sawed fixed on at least one support table by means of an intermediate plate, the sawing process being carried out with relative advancing movement between the piece to be sawed and the layer of wires.

The invention also relates to a device for practicing the mentioned process.

BACKGROUND OF THE INVENTION

Wire sawing devices of the mentioned type, with movement of the wires of the layer of wire or of the piece to be sawed, are already known, especially in the industry of electronic components of ferrites, quartz and silica, to obtain thin slices of material such as poly- or monocrystalline silicon or new materials such as GaAs, InP, GGG or else quartz, synthetic sapphire, ceramic materials.

In known devices, the sawing region is constituted by the assembly of at least two cylinders disposed parallel to each other. These cylinders, called wire guides, are engraved with grooves defining the interval between the wires of the layer, thus the thickness of the slices. The piece to be sawed is fixed on a support table which moves perpendicularly to the layer of wires. The speed of movement defines the cutting speed. Replenishment of the wire, as well as control of its tension, is carried out in a portion called the management zone of the wire located beyond the sawing region properly so called. The agent which effects cutting is either an abrasive fixed on the wire, or a free abrasive supplied in the form of a slurry. The wire acts only as the carrier. During cutting of the piece to be sawed into thin slices, the stretched wire is both guided and tractioned by the wire guide cylinders. The pieces to be sawed in most cases have a prismatic shape based on a rectangle, a square or a pseudo-square.

In conventional sawing processes and devices, the piece or pieces to be sawed are mounted on the machine such that one of their prismatic surfaces will be parallel to the working plane. During the start of sawing, it has thus been noted that the wires of the layer of wires slide on the surface and have the tendency to group themselves two by two, which gives rise to sawed slices or wafers of unequal thickness (FIG. 10), which is very troublesome for numerous applications, leading to frequent rejection.

During sawing, the layer of wires forms a depression and incurvation due to the force of application of the pieces to be sawed, shown in FIG. 1. At the end of sawing, the wires encounter the intermediate plate, typically of glass, but also of epoxy, graphite or other hard materials, on which the piece to be sawed is cemented. Given their incurvation and inclination, the wires penetrate, during their longitudinal advance from this intermediate plate and from the cement, with a small angle, into the material of the piece to be sawed.

The upper edge of the sawed slices thus undergoes prejudicial chipping which should be avoided in the case of numerous applications.

SUMMARY OF THE INVENTION

The present invention has for its object to overcome the mentioned drawbacks, and a process according to the present invention is characterized by the fact that the piece or pieces to be sawed are fixed on the support table such that one of the prismatic surfaces of this piece directed toward the layer of wires, forms a predetermined inclination with said working plane along a line of intersection parallel to the axes of the wire guide cylinders, the size of this angle of inclination being fixed such that, on the one hand, the beginning of sawing takes place on a prismatic edge of the piece or pieces to be sawed, and, on the other hand, at the end of cutting, the wires of the layer of wires are prevented from penetrating from one particular intermediate plate into the piece to be sawed fixed on this particular intermediate plate.

Thanks to these characteristics, it is possible to obtain a regular beginning of sawing with slices of equal thickness and a precise end of sawing without chipping. Two types of major defects of different nature can thus be avoided simultaneously, thanks to the present invention.

The process can preferably be characterized by the fact that there are fixed at least two prismatic pieces to be sawed on the support table, that the wire is given a continuous movement and that the angles of inclination are fixed such that they open in a direction opposite the direction of movement of the wire and such that the sawing of the pieces begins with a prismatic edge located downstream relative to the direction of movement of the wires of the layer of wires.

The beginning of sawing and the end of sawing of the slices can thus be carried out in a particularly exact manner.

The invention also relates to a sawing device for practicing the mentioned process, comprising at least one layer of wires stretched between at least two wire guide cylinders whose axes are parallel to a working plane and held in position by grooves provided on the surface of said wire guide cylinders which define the interval between the wires of said layer of wires, hence the thickness of the sawed slices, the wires being adapted to move with alternating or continuous movement while bearing against at least one prismatic piece to be sawed with a substantially square or rectangular base, fixed on a support table by means of an intermediate plate, means being provided to carry out a relative advance movement between the piece to be sawed and the layer of wires, characterized by the fact that the sawing device comprises inclination members permitting fixing the piece or pieces to be sawed on the support table such that one of the prismatic surfaces directed toward the layer of wires forms a predetermined angle of inclination with said working plane along a line of intersection parallel to the axes of the wire guide cylinders, this angle of inclination being fixed such that, on the one hand, the beginning of sawing takes place at one prismatic edge of the piece or pieces to be sawed, and, on the other hand, at the end of cutting the wires of the layer of wires do not penetrate from a given intermediate plate into the piece to be sawed fixed on this given intermediate plate.

BRIEF DESCRIPTION OF THE DRAWINGS

Other advantages will become apparent from the characteristics set forth in the dependent claims and from the description hereafter setting forth the invention in greater detail, with the help of the drawings, which show schematically and by way of example two embodiments and modifications.

FIGS. 4 to 8 show different modifications of the inclination member.

DETAILED DESCRIPTION OF THE INVENTION

Figure 1:
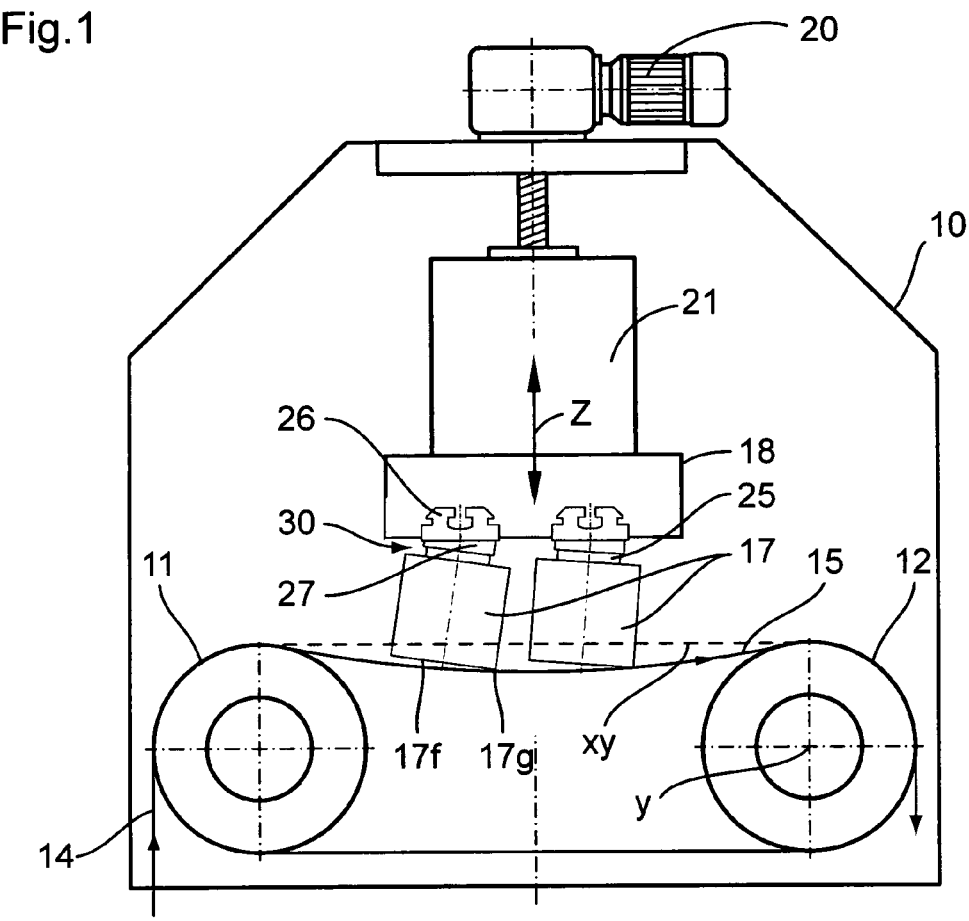
FIG. 1 is a front view of a first embodiment of the invention.
Figure 2A:
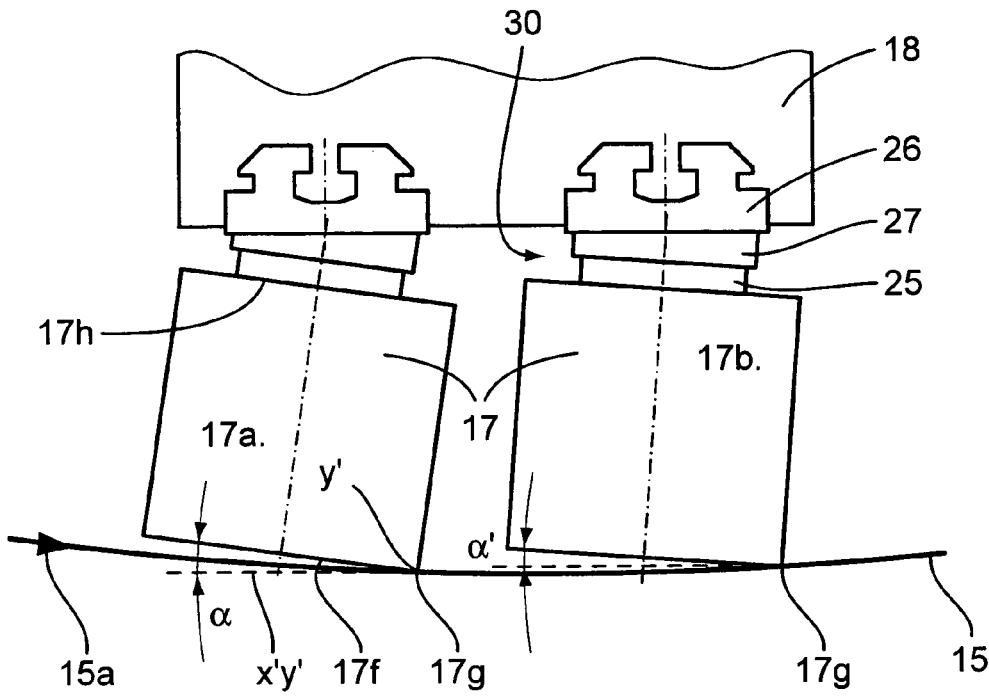
FIGS. 2a and 2b are partial front views of this embodiment in two different positions of sawing.
Figure 2B:
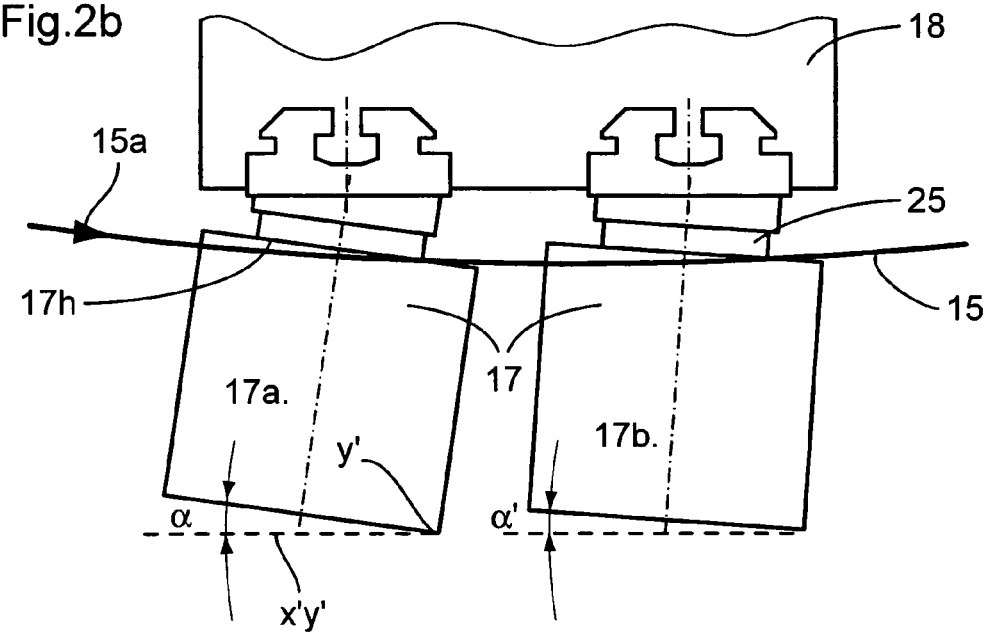

With reference to FIGS. 1, 2a and 2b, the sawing device according to the first embodiment comprises a frame 10 and wire guide cylinders 11, 12, here two in number, mounted on this frame with their axes disposed parallel to each other given of course that the device could have more than two wire guide cylinders, for example four.

The wire 14 is unrolled from a supply bobbin (not shown) and then wound about the wire guide cylinders to form at least one layer 15 of parallel wires in a sawing region. The wire is then recovered in a suitable device (not shown), such as a receiving bobbin or a recovery vat.

One, two or more pieces 17 to be sawed, such as ingots of a hard material, are mounted on a support table 18.

These pieces to be sawed have an elongated prismatic form with a square, pseudo-square or rectangular base and four prismatic principal surfaces of which one, 17f, in the lower position, is directed toward the layer 15 of wires. The edges are sharp in the case of multi-crystalline pieces 17 shown in FIGS. 2a and 2b or rounded (pseudo-square) in the case of mono-crystalline pieces shown in FIG. 3.

The support table 18 can be moved vertically in the direction Z by a column 21 and a motor 20 to cause the pieces 17 to be sawed to bear against the layer 15 of wires.

The periphery of the wire guide cylinders 11, 12 is engraved with grooves which define the interval between adjacent wires of the layer 15 of wires, and hence the thickness of the sawed slices. These latter are separated from each other by sawing slots or interstices.

The wire 14 is stretched and both guided and tensioned by the wire guide cylinders to move with a continuous movement in this embodiment. This wire is preferably constituted by spring steel of a diameter comprised between 0.1 and 0.2 mm so as to saw blocks of hard material or of more particular composition, particularly for the semiconductor industry, solar installations or ceramics, such as silicon, ceramic, compounds of elements of groups III–V and II–VI, GGG (gadolinium-gallium garnet), sapphire, etc., into slices of about 0.1 to 5 mm thickness. The abrasive agent is a commercial product and can be diamond, silicon carbide, alumina, etc. in a form fixed to the wire or in a free form in suspension in a liquid which serves to transport the abrasive particles.

The wire guide cylinders 11, 12 define by their upper generatrices a working plane XY which is parallel to the plane defined by the axes Y of the wire guide cylinders, and in this embodiment perpendicular to the direction Z of advance of the support table 18.

The layer 15 of wires is parallel and contained in this working plane when no piece to be sawed is pressed against it.

On the contrary, during sawing, this layer undergoes a slight bending whose amplitude is exaggerated for easy viewing.

The pieces 17 to be sawed are fixed by cementing on intermediate plates 25, such as plates of glass, epoxy, graphite or other hard materials, and these latter are mounted on the support table 18 by an ingot carrier, in the form of a slide 26 with the interposition of a cementing plate 27.

This latter serves as an inclination member 30 in the form of an angular wedge because it permits fixing the piece 17 to be sawed in a slightly inclined manner, such that the lower prismatic surface 17f directed toward the layer of wires forms a predetermined angle of inclination α, α' with a plane X'Y' parallel to the working plane XY, and this along a straight line of intersection Y' perpendicular to the wires of the layer of wires and parallel to the axes Y of the wire guide cylinders.

Thus, the beginning of sawing (FIG. 2a) can take place along a prismatic edge 17g of the piece 17 to be sawed.

Given that the wires of the layer 15 of wires move from left to right in FIG. 2a, the angle of inclination a opens in a direction opposite to the direction of movement 15a of the wires, such that the sawing of the piece 17 begins with the prismatic edge 17g located downstream relative to the direction of movement 15a of the wires.

This beginning on an edge (FIG. 2a) permits obtaining slices of a thickness equal to each other.

Figure 10:
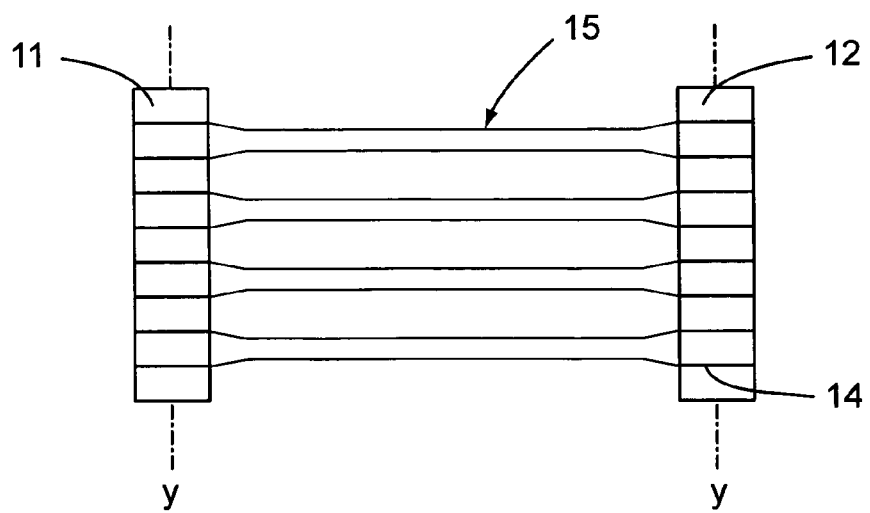
FIG. 10 is a schematic view from above of the layer of wires of a conventional device which is prior art to the present invention.

When beginning cutting with the prismatic surface parallel to the working plane XY and to the layer 15 of wires, it is observed that the wires 14 of the layer 15 of wires have the tendency to group together two by two, which gives rise to sawed slices or wafers of unequal thickness (FIG. 10). This phenomenon disappears after several millimeters of cutting, but is absolutely to be avoided for numerous applications.

At the beginning of cutting with a predetermined angle of inclination α, α', this major drawback is avoided and there is obtained at the outset of sawing sawed slices of equal thickness.

Moreover, at the end of sawing (FIG. 2b) the inclined position of the piece to be sawed is such that the wires of the layer 15 of wires do not penetrate, during their advance, from the intermediate plate 25 into the piece 17 to be sawed fixed on this intermediate plate 25.

On the contrary, the wires always advance at the end of cutting from the piece to be sawed into the intermediate plate, which permits obtaining a penetration of the abrasive into the material to be cut and as a result a very high quality cut without chipping up to the complete end of sawing.

Thus, it was seen in the conventional sawing devices that are prior art to the present invention, that the wires of the layer of wires pass at the end of cutting into the intermediate plate 25 and from this latter through the cement into the piece 17 to be sawed. The cutting of the upper edge 17h thus was subject to prejudicial chipping which is to be avoided for numerous applications.

Thanks to the inclination of the pieces to be sawed, this major drawback is also avoided. Hence by a sawing process and device that is less complicated, the present invention permits overcoming the major defects of two different types of the prior art.

The angle of inclination α, α' can have a value comprised between 0.5° and 7°, preferably between 1° and 3.5°. The upper and lower surfaces of the angular wedge 27 thus form between them an angle α, α' comprised between 0.5 and 7°. Those skilled in the art will easily be able to determine by several tests, the ideal angle of inclination for a given application.

It should be noted that the angles of inclination α, α' of the two pieces 17a and 17b to be sawed, mounted side by side on a same support table 18, have different values. Thus, the angle of inclination α of the piece 17a to be sawed from the piece to be sawed located at the left in FIGS. 2a and 2b, and hence upstream of the path of the wires, is greater than the angle of inclination α' of the other piece 17b to be sawed.

Figure 3:
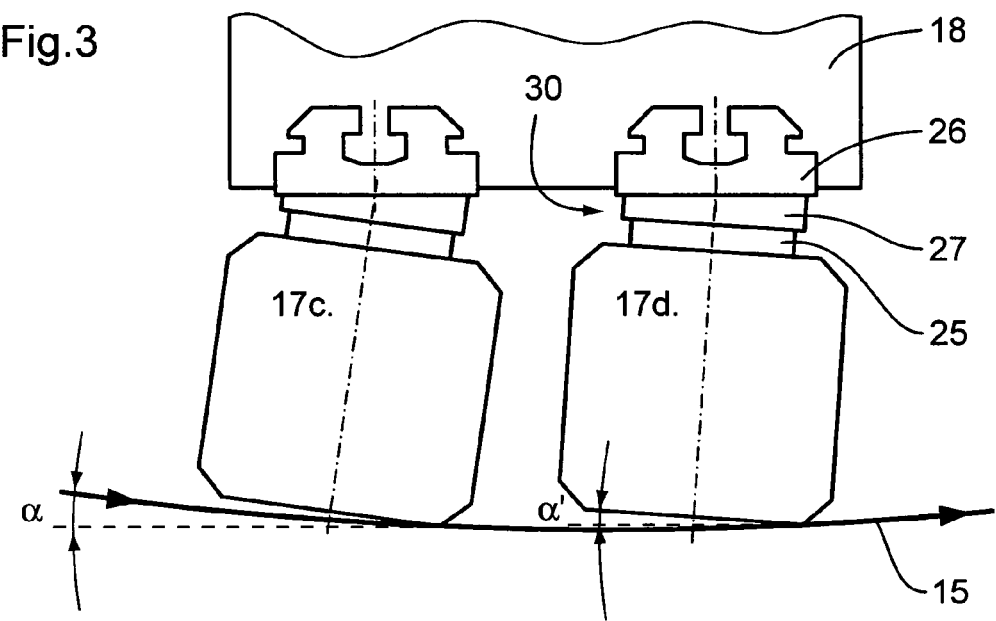
FIG. 3 is a detailed view of this embodiment applied to the sawing of pieces of another type.

In the modification shown in FIG. 3, the pieces 17c and 17d to be sawed are of another type, namely monocrystalline pieces instead of multi-crystalline pieces. These pieces have rounded edges.

However, the sawing process of the device remains the same, because the outset of sawing begins with the downstream edge of the prismatic piece, permitting obtaining slices of equal thickness.

FIG. 4 to 8 show different types of inclination members 30. Thus, the inclination member shown in FIG. 4 is constituted by the cementing plate 27 which has the form of an angular wedge interposed between the intermediate plate 25 and the slide 26.

In the case of FIG. 5, the inclination member 30a is formed by the ingot holder 26a or the slide which has a lower oblique surface 33 onto which is cemented the cementing plate 27a having two principal parallel surfaces. The normal to said lower surface 33 forms an angle of inclination α with the medial plane of the ingot carrier 26a.

The inclination member 30b of FIG. 6 is constituted by a pivoting device 34. This latter comprises a central pivoting axle 35 mounted on the ingot holder 26b and bearing the cementing plate 27b cemented by means of the intermediate plate 25 on the piece 17 to be sawed. Two adjustment screws 36, 37 mounted on the ingot holder 26b coact with the cementing plate 27b and permit adjusting and fixing the angular position of this latter so as to obtain a suitable angle a of inclination.

With reference to FIG. 7, the inclination member 30c comprises a pivotal axle 40 provided laterally on the ingot holder 26c. The cementing plate 27c is mounted pivotally on this axle 40 and its angular position and hence the angle of inclination can be adjusted and fixed by means of the screw-threaded rod 41 and the stop nut 42 mounted on the other side of this cementing plate 27c which carries the intermediate plate 25 and the piece 17 to be sawed.

Finally, the inclination members 30d shown in FIG. 8 comprise a half axle 44 mounted in a semicircular bore 45 of the support table 18 and hence the axial orientation is perpendicular to the wires of the layer of wires. A stop screw 46 permits adjusting the angular position of the half axle 44 and holding this latter in its recess. The axis of the half axle 44 is parallel to the axes of the wire guide cylinders 11, 12.

An ingot holder 26 is mounted on this half axle and carries a piece to be sawed by means of a cementing plate 27d and an intermediate plate 25.

Figure 9:
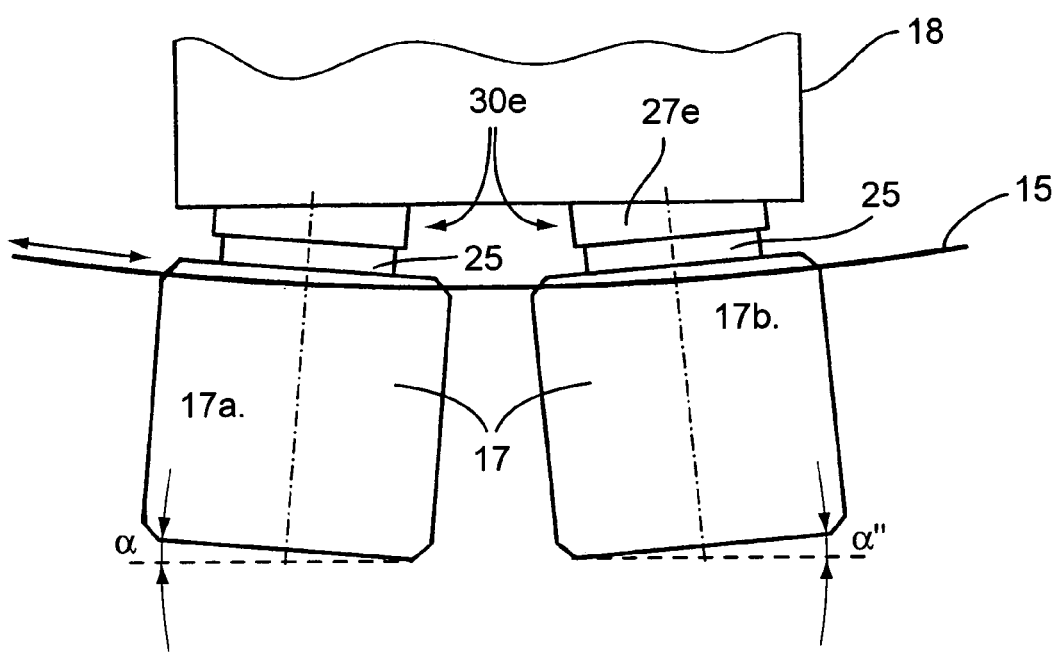
FIG. 9 is a detailed view of a second embodiment.

In the second embodiment shown in FIG. 9, the support table 18 also carries two pieces 17a and 17b to be sawed, by means of intermediate plates 25 and cementing plates 27. However, the wires of the layer 15 of wires in this case have an alternating back and forth movement.

The inclination members 30e are thus in this case arranged such that the angles of inclination α, and α" open in opposite directions relative to each other. Thus, at the end of sawing, the slightly deflected layer of wires will be substantially parallel to the upper prismatic surfaces of the two pieces 17 to be sawed and it is thus avoided that the wires penetrate from the intermediate plate 25 toward the piece 17 to be sawed. The cut is thus without chipping up to the end of sawing.

The inclination members 30e are in this case constituted by two angular wedges 27e forming cementing plates 27. Other inclination members, for example pivotal members mounted on the support table 18 or the ingot holder, could also be used. The angular position α, α" of these pivoting members can thus be adjusted and fixed by means of a stop member, such as a blocking screw.

Of course the embodiments described above are in no way limiting and they can be the subject of any modification that is desirable within the scope defined by claim 1. In particular, the support table 18 could support one or more of the two pieces 17 to be sawed.

The relative movement between the support table 18 and the layer 15 of wires could also be provided by movement of the layer of wires and by any suitable mechanical, pneumatic or hydraulic means.

The ingot carriers 26 could be of a very different construction. The cementing plate or the intermediate plate could be omitted.

Instead of having a support table 18, there could be provided two or more support tables each carrying a predetermined number of support pieces by means of inclination members.

What is claimed is:

1. Wire sawing process comprising:

sawing at least one prismatic piece to be sawed having a substantially rectangular base with a layer of wires stretched between at least two wire guide cylinders whose axes are parallel to a working plane and held in position by grooves provided on the surface of the wire guide cylinders which define an interval between the wires of the layer of wires, hence the thickness of sawed slices;

the wires of the layer being adapted to move while bearing against the piece to be sawed fixed on at least one support table via an intermediate plate;

the sawing being carried out by relative advancing movement between the piece to be sawed and the layer of wires;

wherein the piece to be sawed is fixed on the support table such that a prismatic surface of said piece directed toward the layer of wires forms a predetermined angle of inclination with said working plane along an intersection line parallel to the axes of the wire guide cylinders;

the size of said predetermined angle of inclination being fixed such that the beginning of sawing takes place against a prismatic edge of the piece to be sawed, and at the end of cutting, the wires of the layer of wires are prevented from penetrating from the intermediate plate into the piece to be sawed fixed on said intermediate plate.

2. Process according to claim 1, wherein there are fixed at least two prismatic pieces to be sawed on the support table, the wire is given a continuous movement, and the angles of inclination are fixed such that they open in a direction opposite the direction of movement of the wire, and such that the sawing of the pieces begins with the prismatic edge located downstream relative to the direction of movement of the wires of the layer of wires.

3. Process according to claim 2, wherein the two angles of inclination have different values; the angle of inclination of the piece to be sawed located upstream of the path of the wires being greater.

4. Process according to claim 1, wherein at least two prismatic pieces to be sawed are fixed on the support table, the wire is given an alternating movement, and the angles of inclination are fixed such that they open in opposite directions relative to each other.

5. Process according to claim 1, wherein said angle of inclination is fixed at a value comprised between 0.5° and 7°.

6. Process according to claim 1, wherein said angle of inclination is fixed at a value comprised between 1° and 3.5°.

7. Wire sawing device comprising:
- at least one layer of wires stretched between at least two wire guide cylinders whose axes are parallel to a working plane and held in position by grooves provided on the surface of said wire guide cylinders, which define the interval between the wires of said layer of wires, hence the thickness of sawed slices;
- the wires being adapted to move while bearing against at least one prismatic piece to be sawed and having a substantially rectangular base fixed on a support table via an intermediate plate;
- means for carrying out a relative advancing movement between the piece to be sawed and the layer of wires;
- wherein the sawing device comprises inclination members for fixing the piece to be sawed on the support table such that a prismatic surface of said piece directed toward the layer of wires forms a predetermined angle of inclination with said working plane along a line of intersection parallel to the axes of the wire guide cylinders;
- said predetermined angle of inclination being fixed such that the beginning of sawing takes place at a prismatic edge of the piece to be sawed, and at the end of cutting, the wires of the layer of wires do not penetrate from the intermediate plate into the piece to be sawed fixed on said intermediate plate.

8. Device according to claim 7, wherein the support table is arranged to receive at least two pieces to be sawed, the wire being moved with a continuous movement, and the inclination members are arranged such that the angles of inclination open in a direction opposite to the direction of movement of the wire, and such that the sawing begins with the prismatic edge located downstream relative to the direction of movement of the wires of the layer of wires.

9. Device according to claim 8, wherein the inclination members are arranged such that the angle of inclination of the piece to be sawed located upstream of the path of the wires is greater.

10. Device according to claim 7, wherein the support table is arranged to receive at least two pieces to be sawed, the wire being moved with an alternating movement, and the inclination members are arranged such that the angles of inclination open in opposite directions relative to each other.

11. Device according to claim 7, wherein the inclination members are arranged to obtain angles of inclination comprised between 0.50° and 7°.

12. Device according to claim 7, wherein the inclination members are arranged to obtain angles of inclination comprised between 1° and 3.5°.

13. Device according to claim 7, wherein the inclination members are constituted by an angular wedge interposed between the support table and the piece to be sawed or the intermediate plate.

14. Device according to claim 7, wherein the inclination members are constituted by a pivotal member mounted on the support table, and at least one stop member operatively associated with the pivotal member for adjusting and fixing the angular position of the pivotal member.

\* \* \* \* \*